UNITED STATES PATENT OFFICE.

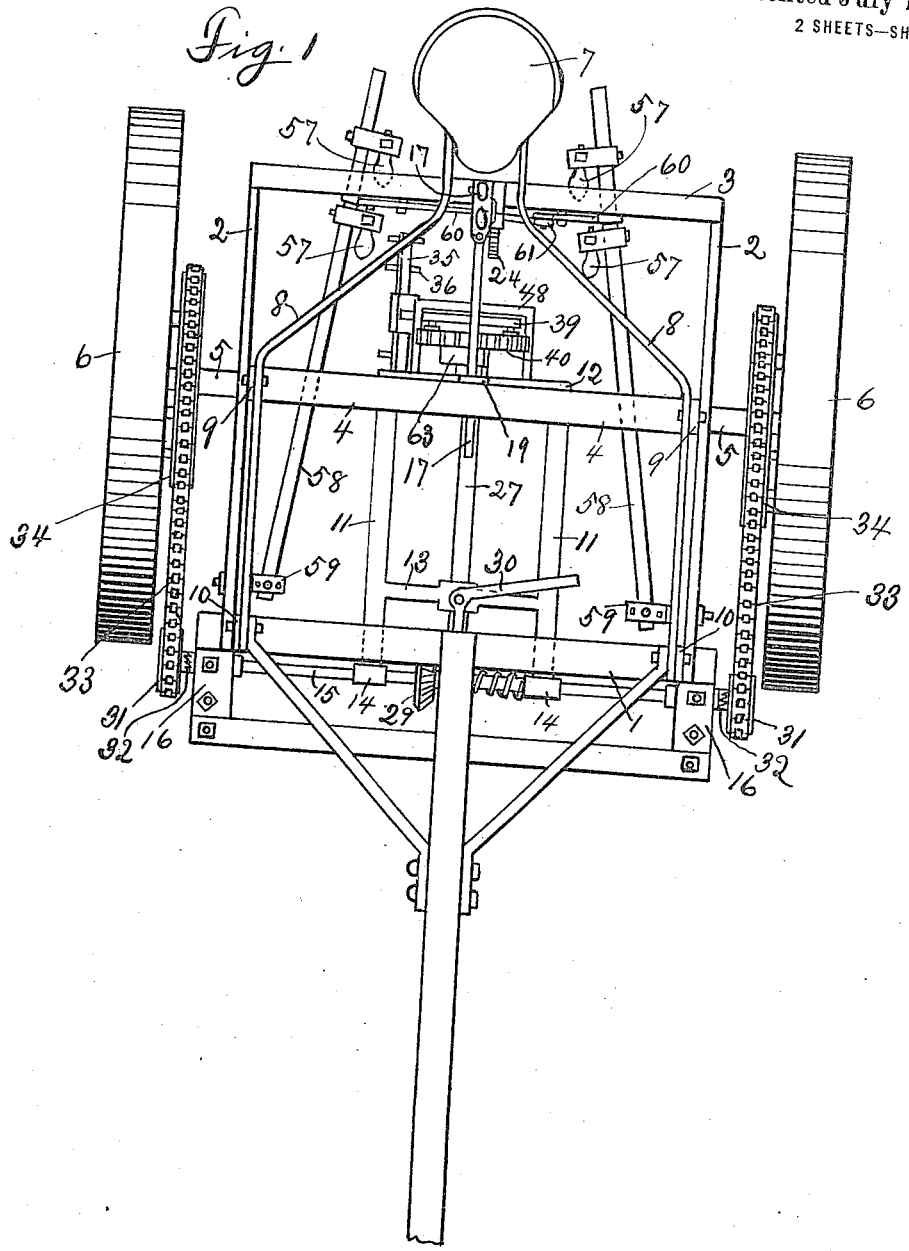

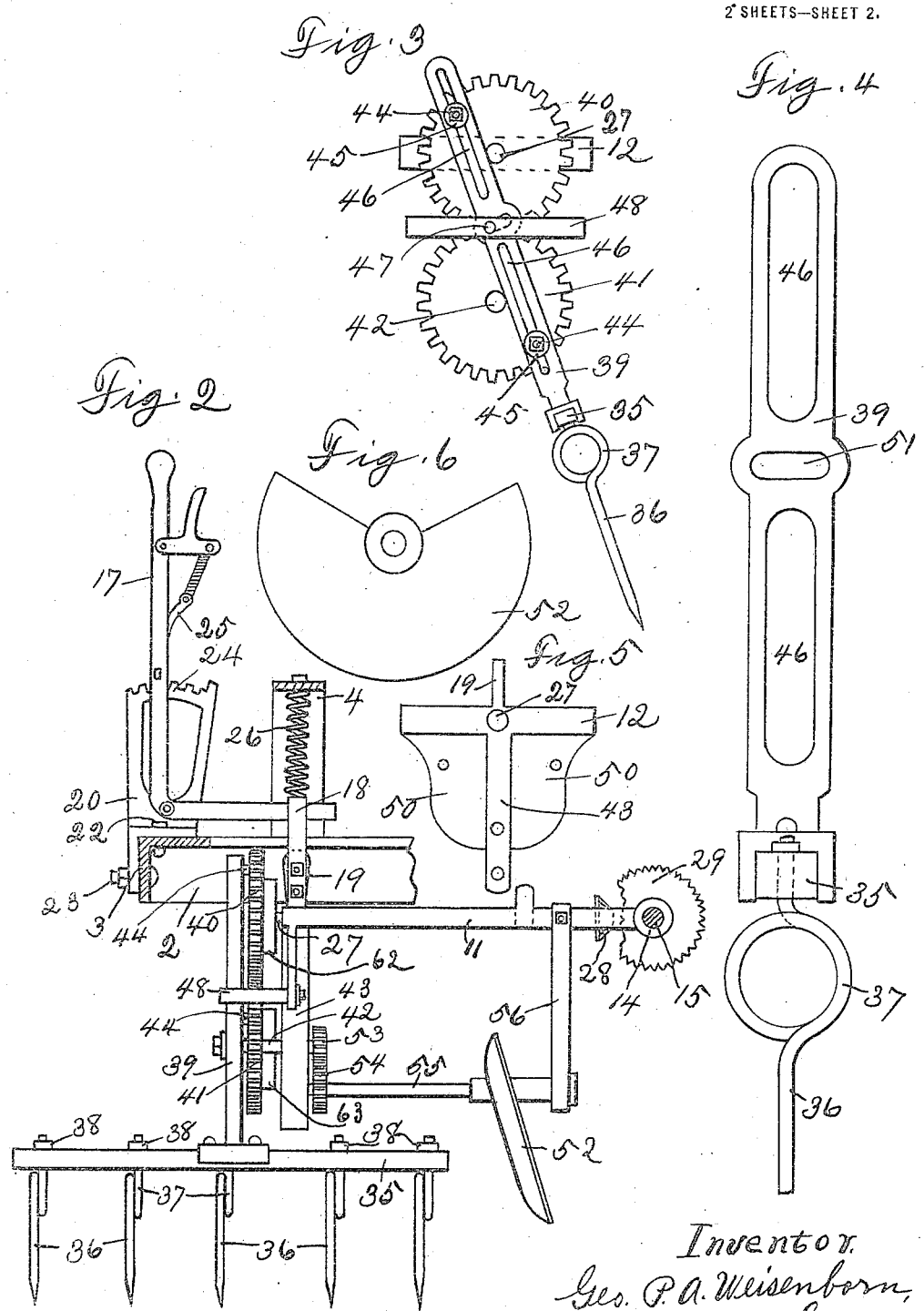

GEORGE P. A. WEISENBORN, OF FORT WORTH, TEXAS.

SCARIFIER AND BLOCKER.

1,232,740.                    Specification of Letters Patent.         Patented July 10, 1917.

Application filed November 9, 1915. Serial No. 60,509.

*To all whom it may concern:*

Be it known that I, GEORGE P. A. WEISENBORN, a citizen of the United States, residing at Fort Worth, in the county of Tarrant and State of Texas, have invented certain new and useful Improvements in Scarifiers and Blockers, of which the following is a specification.

My invention relates to an agricultural implement and more particularly to a scarifier and the means for operating the scarifier; and the object is to provide a simple device for stirring the surface of the ground and particularly to an instrument for stirring the ground about small and tender plants, and to provide simple mechanism for operating the scarifier. Other objects and advantages will be fully explained in the following description and the invention will be more particularly pointed out in the claims.

Reference is had to the accompanying drawings which form a part of this application.

Figure 1 is a plan view of the scarifier mounted on a wheeled truck for operation. Fig. 2 is a side elevation of the scarifier and the mechanism for operating the same. Fig. 3 is a rear elevation of the gearing and the operating lever for vibrating the scarifier. Fig. 4 is an enlarged detail view of the operating arm or vibrator. Fig. 5 is a rear elevation of the frame on which the scarifier operating mechanism is mounted. Fig. 6 is a face view of a blocking device to be operated in connection with the scarifier.

Similar characters of reference are used to indicate the same parts throughout the several views.

A truck is provided for operating the scarifier and this frame has a rectangular frame composed of an arch bar 1, side bars 2 attached thereto, and a rear cross bar 3 attached to the side bars. The frame is further provided with an arch bar 4 which has horizontal portions 5 on which are spindles for the supporting wheels 6. A seat 7 is mounted on the frame by means of arms 8 which are attached to uprights 9 which are attached to the arch bar 4 and to uprights 10 which are attached to the upright portions of frame piece 1.

A rectangular frame has side bars 11, rear cross-bar 12, and a bearing bar 13 near the front end of the frame. The front ends of the bars 11 have bearings or boxes 14 for the operating shaft 15. The forward end of the frame is supported on the shaft 15 which is journaled in bearings 16 which are carried by the lower parts of the arch bar 1. The rear end of the frame 12 is carried by a bell crank lever 17 which engages a yoke 18 which is attached to an upstanding standard 19. The lever 17 is fulcrumed on an upright 20 which is mounted on the frame piece 3 by bolts 22 and 23. The scarifier frame may be held at different elevations at the rear end by the lever 17 and the rack 24 and spring dog 25 which is adapted to engage the rack 24. A spring 26 is mounted on the yoke 18 and connected with the arch bar 4 and will serve to hold the scarifier frame down, but allowing a yielding motion upwardly. A shaft 27 is journaled in the frame piece 12 and in the bearing bar 13 and a beveled pinion 28 is mounted rigidly on the shaft 27 for driving this shaft. A beveled cog wheel 29 is mounted on shaft 15 for driving the pinion 28. The cog wheel 29 is axially movable on the shaft 15 so that it may be moved into and out of mesh with the pinion 28. A lever 30 is provided for throwing the gear wheel 29 into and out of mesh with the pinion 28. The shaft 15 is driven by sprocket wheels 31 and these wheels are provided with clutches 32 by which these wheels can be thrown into or out of operative condition. The wheels 31 are driven by sprocket chains 33 and these chains are driven by sprocket wheels 34 which are attached rigidly to the supporting wheels 6 which serve as drive wheels.

The scarifier consists of a bar 35 and a plurality of agitators or stirrers 36 attached thereto. The agitators 36 are made of resilient material and have loops 37 formed therein to make the agitators more resilient. The agitators are secured to the bar 35 by bolts 38. The scarifier is carried and operated by a lever or arm 39 which is attached to the bar 35 which is operatively connected to spur gear wheels 40 and 41. The wheel 40 is rigid with shaft 27 and is driven by this shaft. The wheel 40 meshes with and drives wheel 41 which is mounted on a shaft 42 which is journaled in the downwardly projecting bar 43 which may be formed integral with the frame piece 12. The lever 39 is operatively connected to the wheels 40 and 41 by eccentric pins or lugs 44 with suitable bolts, and washers 45, and the lever 39 has slots 46 in which the lugs 44 move. The lever 39 is provided with a fulcrum 47 which may be integral with a fulcrum bar 48. The bar 48 is rigidly connected to the scarifier frame by forwardly-projecting arms which are bolted to webs 50 formed on the frame. The lever 39 has a transverse slot 51 for the fulcrum 47. When the wheels 40 and 41 are driven, the lever 39 will be vibrated and the stirrers or agitators 36 will be moved back and forth across the rows while the truck is being moved forward. The slot 51 permits a necessary lateral motion of the lever 39 to prevent binding.

A blocker 52 may be operated in connection with the scarifier. This blocker consists of a mutilated disk and may be driven from the wheel 41 by a spur gear 53 which is rigid with shaft 42 and a spur gear wheel 54 in mesh therewith which is mounted rigidly on the shaft 55 on which the blocker 52 is mounted. The shaft 55 is journaled in an extension of the bar 43 and in a hanger 56 which is attached to the scarifier frame. The blocker 52 may be used to block the plants in front of the agitators or stirrers 36.

Cultivator plows 57 may also be used in coöperation with the scarifier and in the rear of the scarifier. Beams 58 are pivotally connected to bearings 59 which are attached to the frame pieces 2. The rear ends of the beams 59 may be carried in hopples 60 which are pivotally mounted on the frame piece 3 and then pivotally connected together, one of the parts being vertically extended to form a handle by which the plows 57 may be thrown closer toward each other or farther from each other. The plows 57 may be used in the rear of the stirrers 36 and operated by the moving truck.

The motion of the scarifier handle or lever 39 is further controlled by counter weights 62 and 63 which may be formed on the wheels 40 and 41 respectively. The weights 62 and 63 should be so positioned that they will be on opposite sides of a vertical line drawn through the shafts 27 and 42 at times during the operation. These counter-weights regulate the motion of the lever 39.

What I claim, is,—

1. A scarifier comprising a bar carrying a plurality of teeth and means for actuating said bar consisting of a lever attached to said bar, a frame and a fulcrum carried by said frame for said lever, a pair of gear wheels carried by said frame, said lever having slots therein and said wheels having eccentric pins engaging the slots in said lever, and means for driving said wheels.

2. A scarifier comprising a bar carrying a plurality of teeth and means for actuating said bar consisting of a frame and a fulcrum fixedly carried thereby, a lever having a transverse slot and longitudinal slots on either side of said transverse slot and said fulcrum engaging said transverse slot, and gear wheels carried by said frame and provided with eccentric pins engaging said lever in said longitudinal slots for vibrating said lever.

3. The combination of a scarifier and a blocker comprising a frame, a lever fulcrumed on said frame and provided with slots therein, a bar attached to and carried by said lever and provided with a plurality of teeth, a shaft journaled in said frame and carrying said blocker, and gearing including a pair of gear wheels provided with eccentric pins operatively connected with the slots in said lever and with said blocker for vibrating said lever and revolving said blocker.

4. The combination of a scarifier and a blocker comprising a wheeled truck, a frame carried by said truck, a lever fulcrumed on said frame and provided with slots therein, a bar attached to and carried by said lever and provided with a plurality of teeth, a shaft journaled in said frame, and blocker carried by said shaft, gearing on said frame including a pair of gear wheels provided with eccentric pins operatively connected with the slots in said lever and with said blocker shaft, and gearing operatively connected with the wheels of said truck and with said first named gearing for vibrating said lever and for revolving said blocker.

5. The combination of a scarifier and a blocker comprising a bar carrying a plurality of teeth and a blocker operating in front of said scarifier teeth, gearing operatively connected with said bar for vibrating said bar and operatively connected with said blocker for revolving said blocker, and counter weights attached to said gearing for regulating the vibration of said bar.

6. A scarifier comprising a bar carrying a plurality of teeth and means for actuating said bar consisting of a lever attached to said bar, a frame and a fulcrum carried on said frame for said lever, a pair of gear wheels carried by said frame having operative connection with said lever, means for driving said wheels, and counter-weights on said wheels for regulating the movement of said lever.

7. A scarifier comprising a bar carrying a plurality of spring teeth and means for vibrating said bar consisting of a wheeled truck, a frame pivoted at one end, means for holding said frame at different vertical adjustments at the other end, a fulcrum rigid with said frame, a lever having a transverse slot for engaging said fulcrum and having longitudinal slots on either side of said transverse slot, gear wheels carried by said frame provided with eccentric pins engaging said lever in said longitudinal slots, and gearing operatively connected with the wheels of said truck and with said gear wheels for driving said gear wheels.

In testimony whereof I set my hand this 21st day of October, 1915.

GEORGE P. A. WEISENBORN.

Copies of this patent may be obtained for five cents each, by addressing the "Commissioner of Patents, Washington, D. C."